(12) United States Patent
Chang et al.

(10) Patent No.: US 9,857,971 B2
(45) Date of Patent: Jan. 2, 2018

(54) SYSTEM AND METHOD FOR RECEIVING USER INPUT AND PROGRAM STORAGE MEDIUM THEREOF

(71) Applicant: INDUSTRIAL TECHNOLOGY RESEARCH INSTITUTE, Hsinchu (TW)

(72) Inventors: Ming-Wei Chang, Penghu County (TW); Chia-Ming Chang, Hsinchu County (TW); Tzi-Cker Chiueh, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 243 days.

(21) Appl. No.: 14/303,438

(22) Filed: Jun. 12, 2014

(65) Prior Publication Data

US 2015/0153950 A1 Jun. 4, 2015

Related U.S. Application Data

(60) Provisional application No. 61/910,932, filed on Dec. 2, 2013.

(51) Int. Cl.
*G06F 3/0482* (2013.01)
*G06F 3/0488* (2013.01)
*G06F 3/042* (2006.01)
*G06K 9/00* (2006.01)

(52) U.S. Cl.
CPC ........ *G06F 3/04886* (2013.01); *G06F 3/0426* (2013.01); *G06K 9/00389* (2013.01)

(58) Field of Classification Search
CPC .................................................. G06F 3/04886
(Continued)

(56) References Cited

U.S. PATENT DOCUMENTS 6,525,717 B1 * 2/2003 Tang .................... G06F 3/0202
178/18.04
6,771,294 B1 * 8/2004 Pulli ...................... G06F 3/011
345/173

(Continued)

FOREIGN PATENT DOCUMENTS

CN 1273649 A 11/2000
CN 102063183 A 5/2011
(Continued)

OTHER PUBLICATIONS

Andrew Wu et al., "A Virtual 3D Blackboard: 3D Finger Tracking using a Single Camera" Fourth IEEE International Conference on Automatic Face and Gesture Recognition, 2000. Proceedings, pp. 536-543, Mar. 2000.

(Continued)

*Primary Examiner* — Reza Nabi
*Assistant Examiner* — Daniel Rodriguez
(74) *Attorney, Agent, or Firm* — Rabin & Berdo, P.C.

(57) ABSTRACT

A user input method includes the following steps. A virtual keyboard layout and a control region are displayed. The virtual keyboard layout includes a plurality of key subgroups each mapped to a respective one of a plurality of regions of the control region. Locations of an object from at least one captured image are extracted to identify a location of a feature point of the object. A target region in which the feature point is located is determined. Keys mapped to the target region are determined. Movements of the object are translated as input data to the user interface system.

16 Claims, 15 Drawing Sheets

(58) Field of Classification Search
USPC ........................................................ 715/773
See application file for complete search history.

(56) References Cited

U.S. PATENT DOCUMENTS

| | | | | |
|---|---|---|---|---|
| 6,911,972 | B2* | 6/2005 | Brinjes | G06F 1/1626 178/18.01 |
| 7,030,863 | B2* | 4/2006 | Longe | G06F 3/0237 345/172 |
| 7,254,376 | B2 | 8/2007 | Park et al. | |
| 7,774,075 | B2* | 8/2010 | Lin | G06F 3/011 345/156 |
| 7,788,607 | B2 | 8/2010 | Boillot | |
| 7,810,050 | B2* | 10/2010 | Hirai | G06F 3/0425 345/173 |
| 8,140,970 | B2 | 3/2012 | Brown et al. | |
| 8,179,604 | B1* | 5/2012 | Prada Gomez | G02B 27/0093 345/8 |
| 8,228,315 | B1* | 7/2012 | Starner | G02B 27/017 345/175 |
| 9,104,271 | B1* | 8/2015 | Adams | G06F 3/0426 |
| 2002/0057383 | A1* | 5/2002 | Iwamura | G08C 23/00 348/734 |
| 2004/0001097 | A1* | 1/2004 | Zngf | G06F 3/0219 715/773 |
| 2004/0046744 | A1* | 3/2004 | Rafii | G06F 1/1626 345/168 |
| 2005/0009584 | A1* | 1/2005 | Park | H04B 1/385 455/575.6 |
| 2006/0061544 | A1* | 3/2006 | Min | G02B 27/0093 345/156 |
| 2006/0276462 | A1* | 12/2006 | Deadwyler | A61K 31/18 514/229.5 |
| 2008/0062016 | A1* | 3/2008 | Pham | G06F 3/0236 341/23 |
| 2008/0181456 | A1* | 7/2008 | Aoki | G06F 3/017 382/103 |
| 2010/0103106 | A1* | 4/2010 | Chui | G06F 3/017 345/166 |
| 2010/0123658 | A1* | 5/2010 | Demuynck | G06F 3/0236 345/157 |
| 2010/0177035 | A1* | 7/2010 | Schowengerdt | G06F 1/163 345/156 |
| 2010/0214267 | A1* | 8/2010 | Radivojevic | G06F 1/1616 345/175 |
| 2010/0223403 | A1* | 9/2010 | Chau | G06K 19/07 710/14 |
| 2011/0053859 | A1* | 3/2011 | Deadwyler | A61K 38/22 514/18.1 |
| 2011/0197263 | A1* | 8/2011 | Stinson, III | G06F 3/011 726/4 |
| 2011/0221693 | A1* | 9/2011 | Miyazaki | G06F 3/0236 345/173 |
| 2011/0243380 | A1* | 10/2011 | Forutanpour | G06F 3/017 382/103 |
| 2012/0069168 | A1* | 3/2012 | Huang | G06F 3/017 348/77 |
| 2012/0117514 | A1* | 5/2012 | Kim | G06F 3/011 715/849 |
| 2012/0146912 | A1* | 6/2012 | Chen | G06F 3/0416 345/168 |
| 2012/0169611 | A1* | 7/2012 | Chen | G06F 3/04886 345/173 |
| 2012/0212421 | A1* | 8/2012 | Honji | G06F 3/0414 345/173 |
| 2012/0235912 | A1* | 9/2012 | Laubach | G06F 3/04895 345/163 |
| 2012/0242581 | A1* | 9/2012 | Laubach | G06F 3/04812 345/168 |
| 2012/0260207 | A1* | 10/2012 | Treskunov | G06F 3/04886 715/773 |
| 2012/0280910 | A1* | 11/2012 | Brinkman | G06F 3/014 345/158 |
| 2012/0323364 | A1* | 12/2012 | Birkenbach | G06F 3/014 700/257 |
| 2013/0016070 | A1* | 1/2013 | Starner | G02B 27/017 345/175 |
| 2013/0139093 | A1* | 5/2013 | Kobayashi | G06F 3/04886 715/773 |
| 2013/0265218 | A1* | 10/2013 | Moscarillo | G06F 3/017 345/156 |
| 2013/0275907 | A1* | 10/2013 | Lau | G06F 3/04886 715/773 |
| 2013/0342441 | A1* | 12/2013 | Murase | G06F 3/0236 345/156 |
| 2014/0049452 | A1* | 2/2014 | Maltz | G06F 3/013 345/8 |
| 2014/0149950 | A1* | 5/2014 | Mun | G06F 3/017 715/863 |
| 2014/0168084 | A1* | 6/2014 | Burr | G06F 3/0304 345/168 |
| 2014/0184957 | A1* | 7/2014 | Satou | G06F 1/169 349/12 |
| 2014/0201827 | A1* | 7/2014 | Okazaki | G06F 1/1616 726/7 |
| 2014/0218297 | A1* | 8/2014 | Mortel | G06F 3/0233 345/168 |
| 2014/0240267 | A1* | 8/2014 | Luo | G06F 3/0488 345/173 |
| 2014/0253486 | A1* | 9/2014 | Luo | G06F 3/0488 345/173 |
| 2014/0253515 | A1* | 9/2014 | Luo | G06F 3/0414 345/175 |
| 2014/0267042 | A1* | 9/2014 | Burr | G06K 9/00355 345/168 |
| 2014/0267044 | A1* | 9/2014 | Andersen | G06F 3/04886 345/168 |
| 2014/0267049 | A1* | 9/2014 | Durham | G06F 3/0235 345/168 |
| 2014/0267121 | A1* | 9/2014 | Luo | G06F 3/0416 345/173 |
| 2014/0313168 | A1* | 10/2014 | Luo | G06F 3/0488 345/175 |
| 2014/0337786 | A1* | 11/2014 | Luo | G06F 3/0416 715/773 |
| 2015/0029090 | A1* | 1/2015 | Kim | G06F 3/017 345/156 |
| 2015/0058782 | A1* | 2/2015 | Kutliroff | G06F 3/04815 715/773 |
| 2015/0084884 | A1* | 3/2015 | Cherradi El Fadili | G06F 3/041 345/173 |
| 2015/0100910 | A1* | 4/2015 | Luo | G06F 3/04883 715/771 |
| 2015/0143276 | A1* | 5/2015 | Luo | G06F 1/1626 715/773 |
| 2016/0034738 | A1* | 2/2016 | Luo | G06K 9/001 382/125 |
| 2016/0132111 | A1* | 5/2016 | Lowe | G06F 3/04886 345/156 |
| 2016/0253044 | A1* | 9/2016 | Katz | G06F 3/017 |

FOREIGN PATENT DOCUMENTS

| | | |
|---|---|---|
| CN | 102906623 A | 1/2013 |
| JP | 2010-277469 A | 12/2010 |
| TW | 459195 B | 10/2001 |
| TW | 201025078 A | 7/2010 |
| TW | 201131440 A | 6/2011 |
| TW | 201145151 A | 12/2011 |
| TW | 201201090 A | 1/2012 |

OTHER PUBLICATIONS

Kent Lyons et al., "Experimental Evaluations of the Twiddler One-Handed Chording Mobile Keyboard" Human-Computer Interaction, 2006, vol. 21, pp. 343-392, Nov. 2006.

Kazuhiro Terajima et al., "Fast Finger Tracking System for In-air Typing Interface" CHI'09, Extended Abstracts on Human Factors in Computing Systems, pp. 3739-3744, Apr. 2009.

(56) References Cited

OTHER PUBLICATIONS

Ibrahim Furkan Ince et al., "Hand Mouse: Real Time Hand Motion Detection System Based on Analysis of finger Blobs" JDCTA, International Journal of Digital Content Technology and its Applications, vol. 14, Issue 2.5, pp. 40-56, 2010.

Zhengyou Zhang et al., "Visual Panel: Virtual Mouse, Keyboard and 3D Controller with and Ordinary Piece of Paper" Proceddings of the 2001 workshop on Perceptive user interaces, pp. 1-8, Nov. 2001.

Francine Evans et al., "VType: Entering Text in a Virtual World" Submitted to International Journal of Human-Computer Studies, 1999.

Paul Viola et al., "Robust Real-time Face Detection" International Journal of Computer Vision, vol. 57, No. 2, 2004.

P. Kakumanu et al., "A Survey of skin-color modeling and detection methods" Pattern Recognition, vol. 40, Issue 3, pp. 1106-1122, Mar. 2007.

V.A. Oliveira et al., "Skin Detection using HSV color space" Workships of Sibgrapi, pp. 1-2, 2009.

Nada B. Ibrahim et al., "A Dynamic Skin Detector Based on Face Skin Tone Color" 2012 8th Internation Conference on Informatics and Systems (INFOS), pp. 1-5, May 2012.

Farhad Dadgostar et al., "An adaptive real-time skin detector based on Hue thresholding: A comparison on two motion tracking methods" Pattern Recognition Letters, vol. 27, Issue 12, pp. 1342-1352, Sep. 2006.

X. Zaublis et al., "Vision-based Hand Gesture Recognition for Human-Computer Interaction" The Universal Access Handbook, 2009.

Nam Vo et al., "An Efficient Human-Computer Interaction Framework Using Skin Color Tracking and Gesture Recognition" 2010 IEEE RIVF International Conference on Computing and Communication Technologies, Research, Innovation, and Vision for the Future (RIVF), pp. 1-6, Nov. 2010.

John G. Allen et al., "Object Tracking Using CamShift Algorithm and Multiple Quantized Feature Spaces" VIP'05 Proceedings of the Pan-Sydney area workshop on Visual Information Processing, pp. 3-7, Jun. 2004.

Iason Oikonomidis et al., "Efficient Model-based 3D Tracking of Hand Articulations using Kinect" Proceedings of the British Machine Vision Conference, Sep. 2011.

Andrej Fogelton "Real-time Hand Tracking using Flocks of Features" Proceedings of CESCG, 2011.

Mathias Kolsch et al., "Fast 2D Hand Tracking with Flocks of Features and Multi-Cue Integration" Computer Vision and Pattern Recognition Workshop, 2004.

Shahzad Malik et al., "Real-time Hand Tracking and Finger Tracking for Interaction" Department of Computer Science, University of Toronto, CSC2503F Project Report, Dec. 2003.

Minkyung Lee et al., "ARKB: 3D vision-based Augmented Reality Keyboard" International Conference on Artificial Reality and Telexistence, 2003.

Ming-Wei Chang et al., "Virtual keyboard for head mounted display-based wearable devices", 20th IEEE International Conference, pp. 225-232, Dec. 16-19, 2014.

Taiwanese Notice of Allowance dated Jan. 19, 2016.

\* cited by examiner

US 9,857,971 B2

SYSTEM AND METHOD FOR RECEIVING USER INPUT AND PROGRAM STORAGE MEDIUM THEREOF

This application claims the benefit of U.S. provisional application Ser. No. 61/910,932, filed Dec. 2, 2013, the subject matter of which is incorporated herein by reference.

TECHNICAL FIELD

The disclosure relates in general to a system and a method for receiving user input and a program storage medium thereof.

BACKGROUND

In recent years, various user interface systems or systems for receiving user input have been proposed. In general, a user interface system is a system by which people interact with a machine (for example, a personal computer (PC)). The user interface system provides a way of input for allowing the user to manipulate a system, and a way of output for allowing the system to indicate the result of the user's manipulation.

It is desired to provide a system for receiving user input which the user can operate in an easy, efficient and enjoyable way.

SUMMARY

The disclosure relates in general to a system and a method for receiving user input.

A user input method includes the following steps. A virtual keyboard layout and a control region are displayed. The virtual keyboard layout includes a plurality of key subgroups each mapped to a respective one of a plurality of regions of the control region. Images of an object from at least one captured image are extracted to identify a location of a feature point of the object. A target region in which the feature point is located is determined. Keys mapped to the target region are determined. Movements of the objects are translated as input data to the user interface system.

The disclosure is directed to a method and a system for receiving user input. In one example of the disclosure, a method for receiving input data including the following steps is provided. A virtual keyboard layout and a control region are displayed. The virtual keyboard layout includes a plurality of key subgroups each mapped to a respective one of a plurality of regions of the control region. Images of an object from at least one captured image are extracted to identify the location of a feature point of the object. A target region in which the feature point is located is determined. Keys mapped to the target region are determined. Movements of the object are translated as input data to a user interface system.

In another example of the disclosure, a system for receiving user input is provided. The system includes a display, a sensor and a computing system. The display is for displaying a virtual keyboard layout and a control region, the virtual keyboard layout including a plurality of key subgroups each mapped to a respective one of a plurality of regions of the control region. The sensor is for sensing movements of an object. The computing system is coupled to the sensor and the display. The computing system extracts a plurality of locations of the object from at least one captured image to identify the location of a feature point of the object. The computing system determines among the regions of the control region a target region in which the feature point is located. The computing system determines a plurality of keys mapped to the target region and for translating the movements of the object as input data to the system.

In still another example of the disclosure, provided is a program storage medium storing a computer program for causing an electronic device to perform the above steps.

Figure 1:
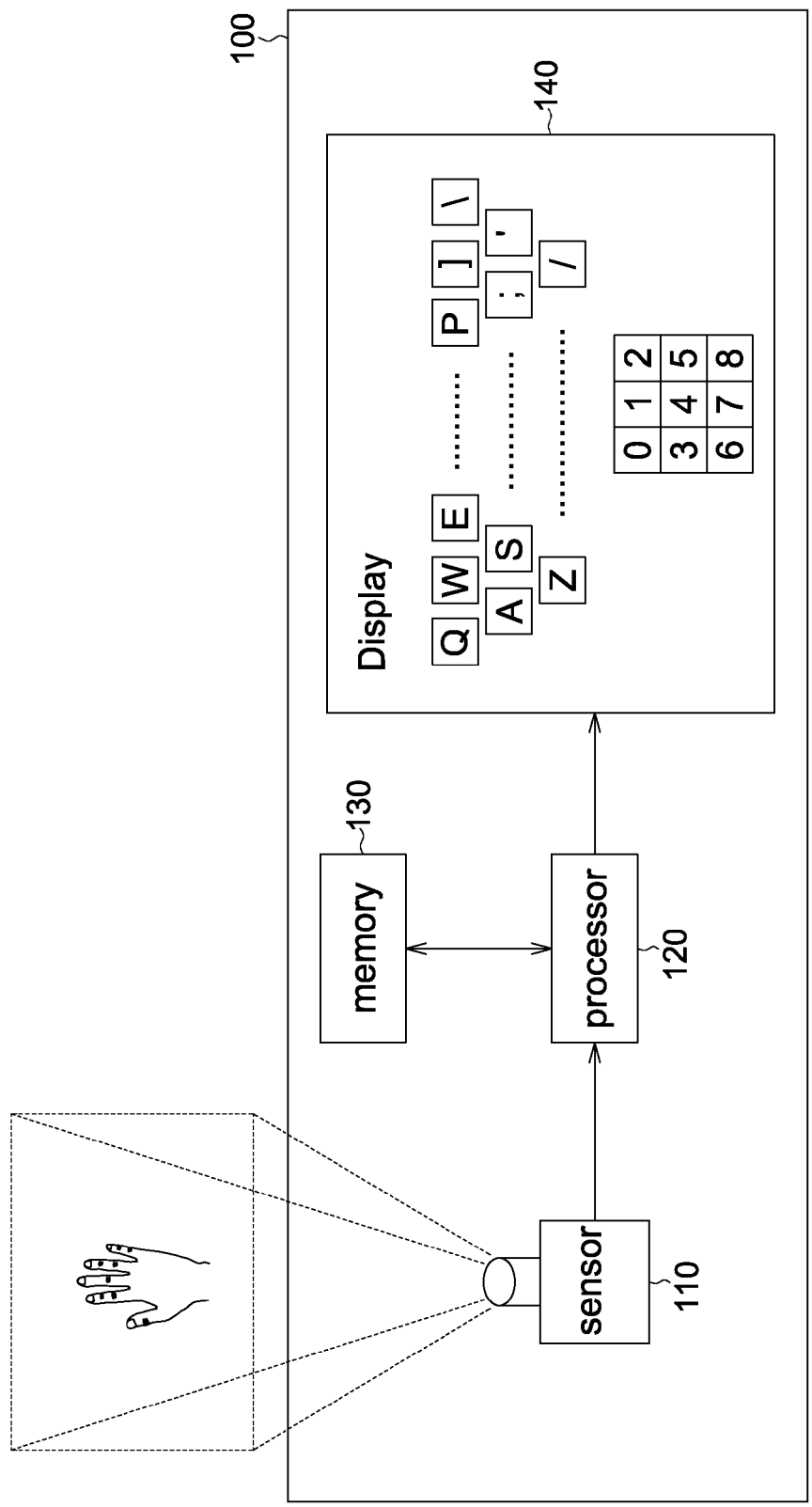
FIG. 1 shows an example user interface system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows an example user interface system 100 according to an embodiment of the disclosure. As shown in FIG. 1, the user interface system includes a sensor 110, a processor 120, a memory 130, and a display 140.

The user interface system 100 may receive data and display information corresponding to the received data. For example, the user interface system 100 may be a head-mounted display system, such as glasses or any type of near eye display unit including a display.

The sensor 110 detects when the user finger(s) and the user hand(s) are moving, and sends the sensing result to the processor 120. The user interface system may include one or more sensors coupled to the processor 120.

The processor 120 may interpret the hand/finger movements as input data to the user interface system 100. The processor 120 may configure data to be displayed on the display. The processor 120 may be any type of processor, such as a microprocessor (single core or multi-core), a digital signal processor (DSP), a graphical processing unit, and so on.

The memory 130 is an on-board data storage of the user interface system 100. The memory 130 is coupled to the processor 120. The memory 130 may store software that can be accessed and executed by the processor 120.

The display 140 may be for example an optical see-through display, an optical see-around display, a video see-through display, a liquid crystal display (LCD), a plasma display, or other displays of image generation. The display 140 is configured to receive data, in a wired or wireless manner, with the processor 120.

Figure 2A:
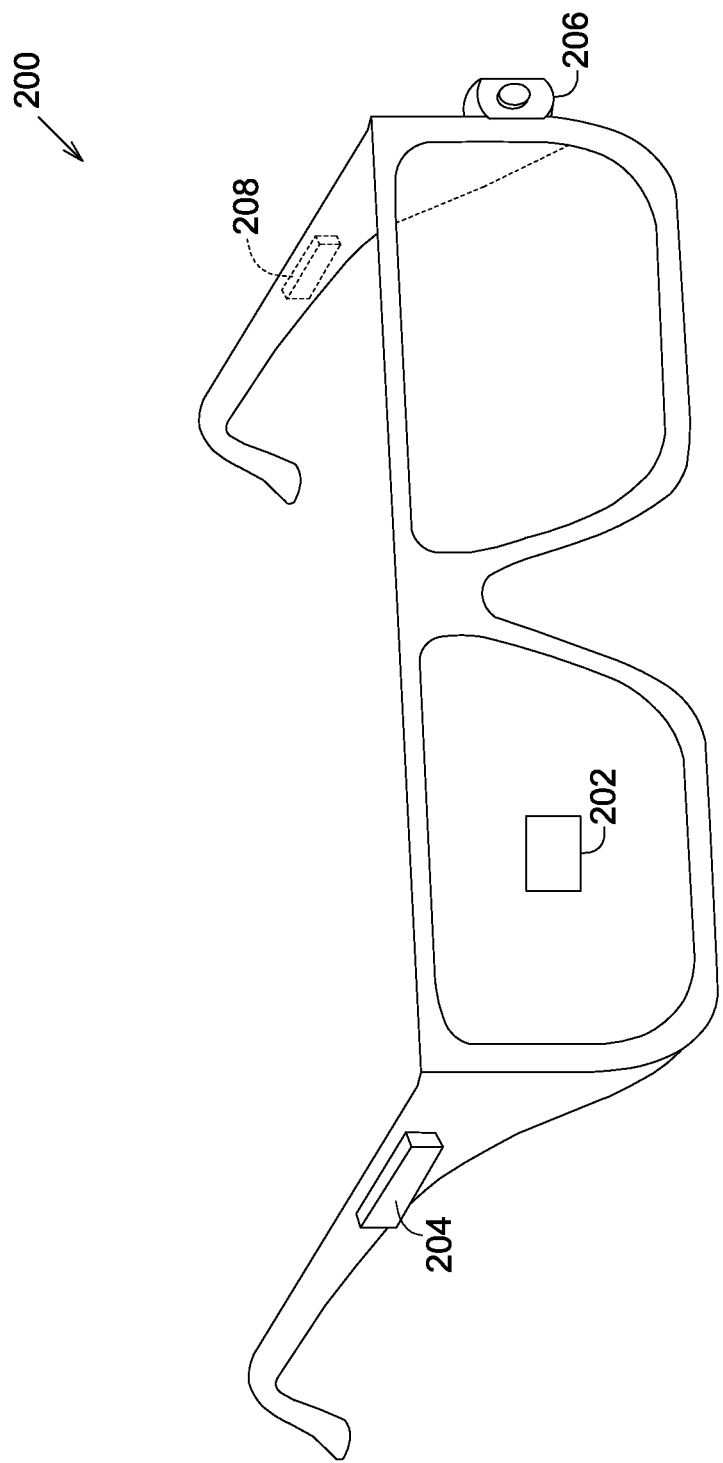
FIG. 2A shows an example of the user interface system in the form of a wearable computing device.

Referring to FIG. 2A, an example of the user interface system 200 is shown in the form of a wearable computing device, such as a head-mounted display (HMD) that includes a pair of eyeglasses. The user interface system 200 includes a display 202, an on-board computing system 204, a video camera 206, and a sensor 208.

The display 202 may be configured to overlay computer-generated graphics in the user's view of the physical world. That is to say, if the display 202 displays a virtual keyboard and the user's hand is within the view of the user, then the user may see the virtual keyboard and his/her hand concurrently.

In FIG. 2A, the single display 202 is shown to be provided in a center of a lens of the pair of eyeglasses. However, the disclosure is not limited to this. For example, the display 202 may be provided in other positions. Further, the user interface system 200 may include more than one display, such as, for example, to provide a second display on the opposite lens of the eyeglasses, or multiple displays in one lens. The display 202 is coupled to and controlled by the on-board computing system 204.

The on-board computing system 204 is, for example, to be positioned on an arm of the pair of eyeglasses or other positions (e.g., such as at a nose of the eyeglasses), but not limited thereto. The on-board computing system 204 may include a processor (for example, the processor 120 in FIG. 1) and a memory (for example, the memory 130 in FIG. 1). The on-board computing system 204 may receive and analyze data from the video camera 206 (and possibly data from other sensory devices and/or user interfaces), and to control the display 202 accordingly. Furthermore, graphic data, video data, image data, text data and etc. from other data source may be relayed from the on-board computing system 204 to the display 202.

The video camera 206 is mounted for example on a frame of the eyeglasses or at other positions as well. The video camera 206 may be configured to capture images at various resolutions and/or at different frame rates. Video cameras with a small size, such as those used in cell phones, webcams, etc., may be incorporated into an example of the user interface system 200. However, it should be understood that examples described herein are not limited to any particular type of video camera. In addition to one video camera 206 as illustrated in FIG. 2A, more video cameras may be used, and each may be configured to capture the same view, or to capture different perspectives or views, and thus may be mounted on other areas of the pair of eyeglasses. The video camera 206 may be a 2D (two dimensional) video camera or a 3D video camera.

The video camera 206 is used to capture a view similar to the users view. Other configurations are also possible. As shown in FIG. 2A, the video camera 206 may be mounted on an arm of the eyeglasses, however the video camera 206 may also be positioned on other areas of the user interface system 200. Alternatively, the video camera 206 may be mounted on a user's forehead or in between the user's eyes. The video camera 206 may be oriented in the same direction as the user's eyes to capture images in front of the eyeglasses.

Position and size of the display 202 are set such that the displayed images appear to be "float" in a user's view of the physical world, thus providing an experience in which computer-generated information can be merged with the user's perception of the physical world. To do so, on-board computing system 204 may be configured to analyze video that is captured by the video camera 206 to determine what graphics should be displayed, and how the graphics should be displayed (e.g., location on the display, size of the graphics, etc.).

The sensor 208 is shown mounted on an arm of the pair of eyeglasses; however, the sensor 208 may be positioned on other areas of the user interface system 200. In addition, additional sensors may be included on the user interface system 200.

Figure 2B:
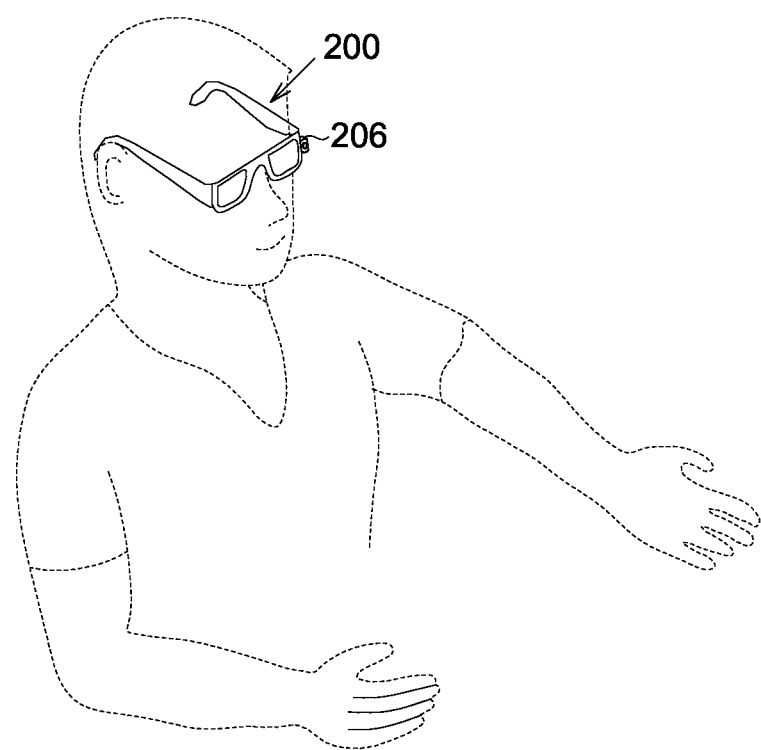
FIG. 2B shows an example operation of the user interface system of FIG. 2A.
Figure 2C:
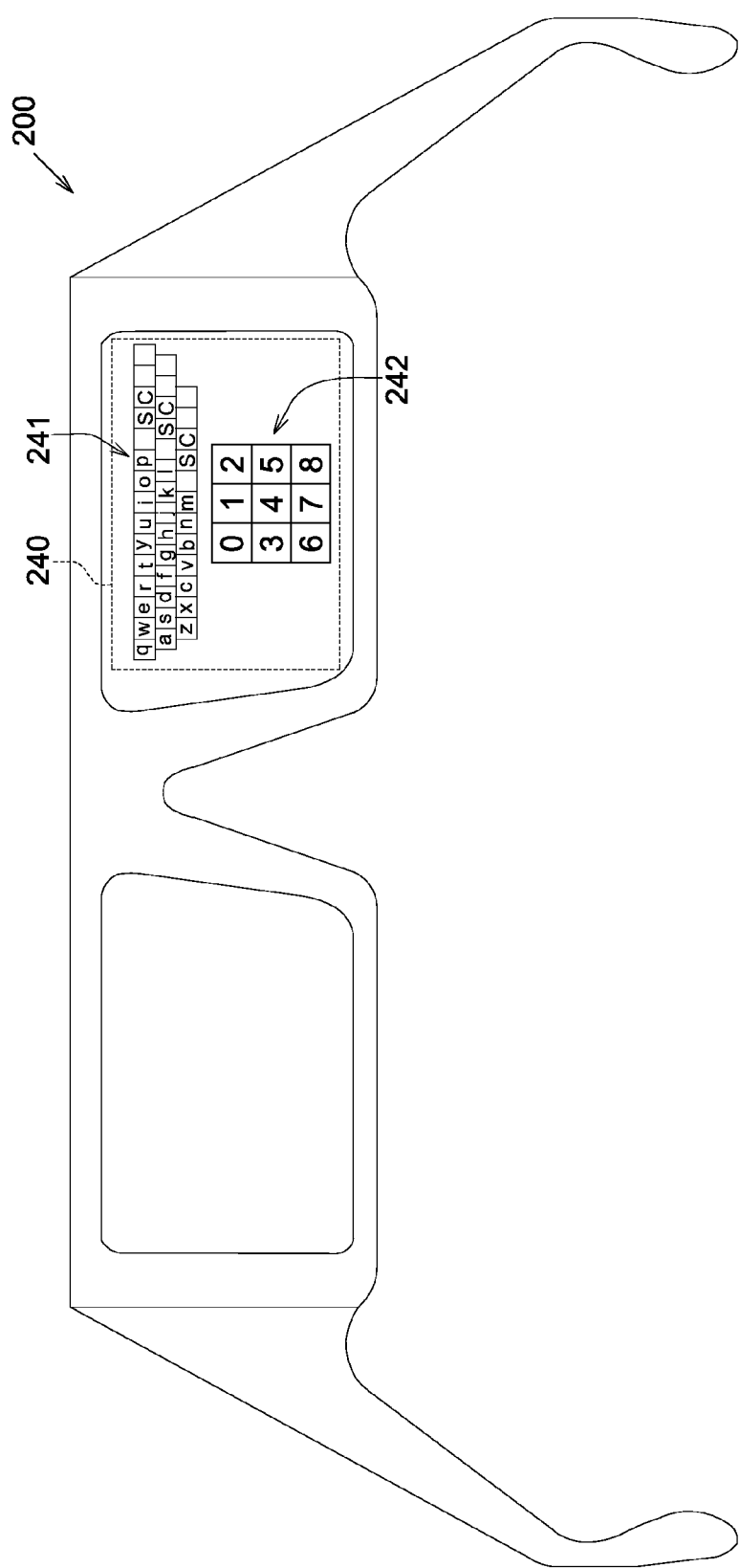
FIG. 2C illustrates an example of the user interface system of FIG. 2A which displays a pattern for virtual input.

FIG. 2B shows an example operation of the user interface system 200 of FIG. 2A. In one example, a user may wear the user interface system 200 as a pair of eyeglasses. FIG. 2C illustrates an example of the user interface system of FIG. 2A. In FIG. 2C, a pattern 240 for the virtual input may be displayed on the display 202 of the glasses.

The pattern 240 for the virtual input may include a QWERTY-like keyboard 241 and a control region 242. The pattern 240 is sent from the on-board computing system 204 to the display 202.

In this example, the QWERTY-like keyboard 241 may be divided into a plurality of subgroups and each subgroup is mapped to a respective region of the control region 242 in a predetermined mapping relationship.

As shown in FIG. 2C, the QWERTY-like keyboard 241 may be divided into 9 subgroups. The relationship between the subgroups of the QWERTY-like keyboard 241 and the 9 regions of the control region 242, for example, may be summarized in a key-region mapping table as shown in Table 1 below.

TABLE 1

| Region | Keys related to a first one of the fingers of user hand | Keys related to a second one of the fingers of user hand | Keys related to a third one of the fingers of user hand | Keys related to a fourth one of the fingers of user hand | Keys related to a fifth one of the fingers of user hand |
|---|---|---|---|---|---|
| 0 | q | w | e | r | t |
| 1 | y | u | i | o | p |
| 2 | N/A | S (Space) | C (Clear) | N/A | N/A |
| 3 | a | s | d | f | g |
| 4 | g | h | j | k | l |
| 5 | N/A | S (Space) | C (Clear) | N/A | N/A |
| 6 | z | x | c | v | b |
| 7 | c | v | b | n | m |
| 8 | N/A | S (Space) | C (Clear) | N/A | N/A |

In the above, the first one, the second one, the third one, the fourth one, and the fifth one of the fingers may be for example the thumb, the index finger, the middle finger, the ring finger and the little finger of the right hand of the user, respectively.

In another example, the first one, the second one, the third one, the fourth one, and the fifth one of the fingers may be for example the little finger, the ring finger, the middle finger, the index finger and the thumb of the left hand of the user, respectively.

The subgroups of the keyboard are mapped to the respective regions based on the position of the subgroups in the QWERTY-like keyboard 241 and the position of the regions in the control region. For example, the respective key subgroup "qwert" on the left-up corner of the keyboard is mapped to the region "0" on the left-up corner of the control region. Moreover, the respective key subgroup of the virtual keyboard layout is mapped to the respective region of the control region based on the position of the plurality of key subgroups in the virtual keyboard layout and the position of the region in the control region.

Exemplary embodiments of the above table and how to type on the user interface system 200 are described in the following.

The user interface system 200 is shown embodied with a pair of glasses in FIGS. 2A-2C. In addition, components of the system may be separate from the glasses. For example, the camera 206 and/or the sensor 208 may be separate or removable from the glasses and could be attached to a user at other areas including a neck, chest, wrist or belt, and configured to capture images and to sense user hand(s)/finger(s) movements.

Referring to FIGS. 3A-3D, examples of inputting (air typing) on the user interface system are illustrated wherein a user can input data by wearing markers or gloves. When the user wants to type, the user reaches his/her right hand within the range of the camera and the sensor. In this example, before air typing, the user wears a glove 320 with a feature point marker 330 and five fingernail-type markers 340. When the user wears the glove 320, the position of the feature point marker 330 is related to a feature point of the user hand. The feature point is, for example but not limited by, any point on a back of the user hand (for example, the feature point includes a thumb-index web or a pit of the user hand or the center of the back of the user hand). The fingernail-type markers 340 are related to the fingernails of the user hand 310. The fingernail-type markers 340 may be for example, a ring, a tape adhesive or removable to the fingernail/finger or a nail polish wiped on the fingernail. In the following description, the position of the feature point marker 330 is related to the back of the user hand.

When typing, the user reaches his/her right hand 310 until the on-board computing system 204 determines that the feature point marker 330 of the glove 320 is located within the target region of the control region. For example, in FIG. 3A, the user interface system 200 determines whether the feature point marker 330 of the glove 320 is located within the region "3" of the control region. If so, then the user interface system 200 determines that the user wants to type one of the keys a, s, d, f and g.

For this determination made by the on-board computing system 204, the sensor 110 or the video camera 206 senses/captures the feature point marker 330 and the fingernail-type markers 340 and sends the sensing/capturing results to the on-board computing system 204.

Based on the captured images, after the on-board computing system 204 extracts images of the feature point marker 330 and the fingernail-type markers 340, the on-board computing system 204 obtains the coordinates of the feature point marker 330 and the fingernail-type markers 340. The on-board computing system 204 compares the coordinates of the feature point marker 330 with the coordinates of the regions of the control region to determine the region in which the feature point marker 330 is located.

After the on-board computing system 204 determines the target region in which the feature point marker 330 is located, the on-board computing system 204 controls the display 202 to display an active identifier 360. The active identifier 360 shows which keys are mapped to the target region where the feature point marker 330 is located. The active identifier 360 may be highlighted so that the user may easily see which keys are mapped (or active). Therefore, the user may type on the user interface system 200.

For example, if the user wants to type "d" which is mapped to the region "3", the user moves his/her right hand until the on-board computing system 204 of the user interface system 200 determines that the feature point marker 330 of the user right hand 310 is located within the region "3" of the control region. Then, the on-board computing system 204 controls the display 202 to display the active identifier 360. After the active identifier 360 is displayed (the active identifier 360 surrounding the keys a, s, d, f and g), the user moves/taps/bends the middle finger. The on-board computing system 204 translates this finger movement as click on the key "d". By identifying/translating this finger click as clicking the key "d", the on-board computing system 204 controls the display 202 to display a typing result 370 which shows "d" and sends a typing event, which indicates that the key "d" is struck to a host (not shown).

Figure 3A:
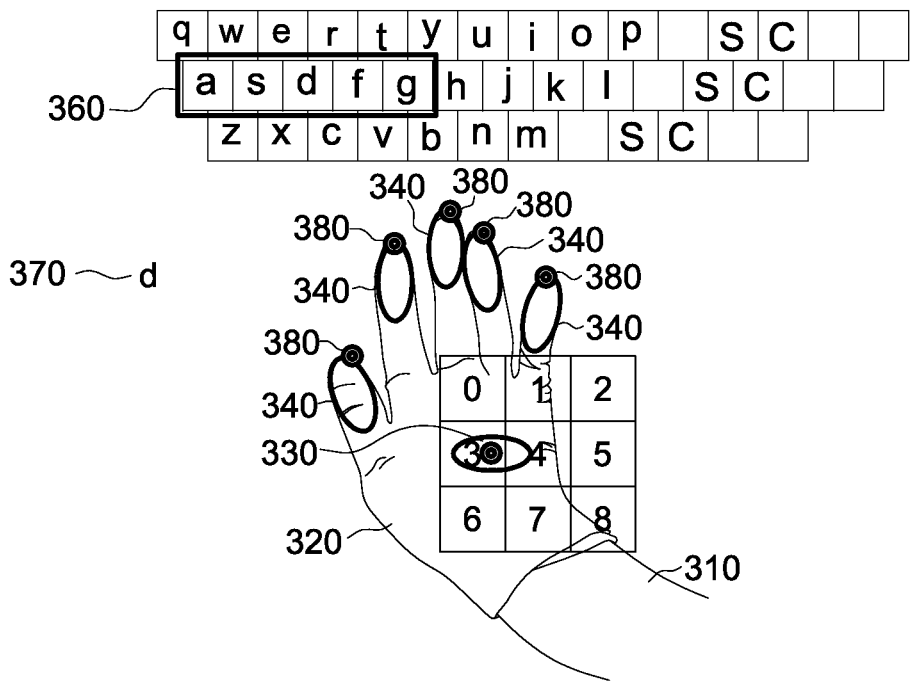
FIGS. 3A-3D show examples of inputting data on the user interface system that user can input data by wearing markers or gloves.
Figure 3B:
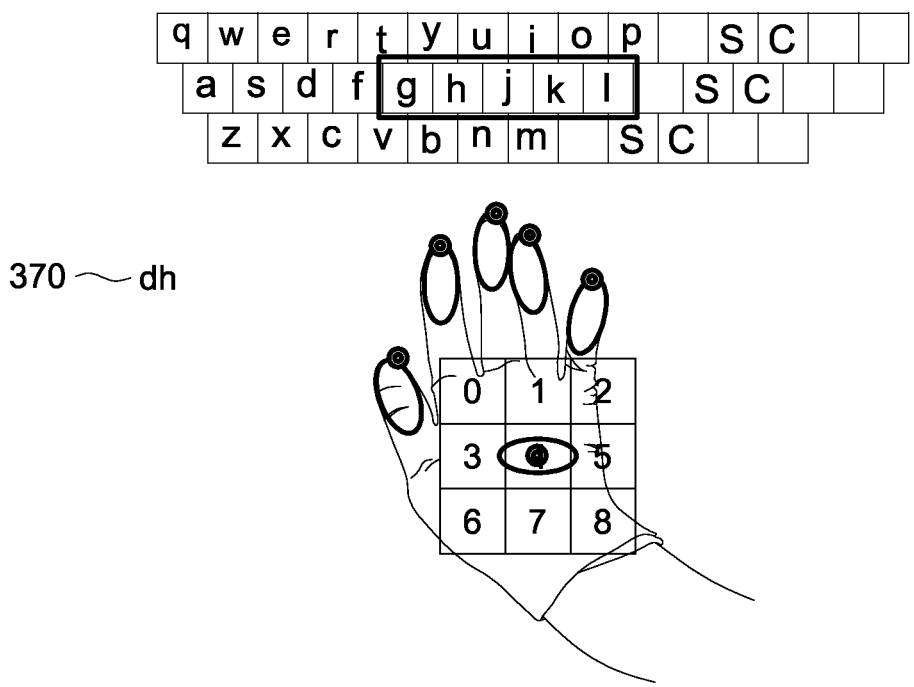
Figure 3C:
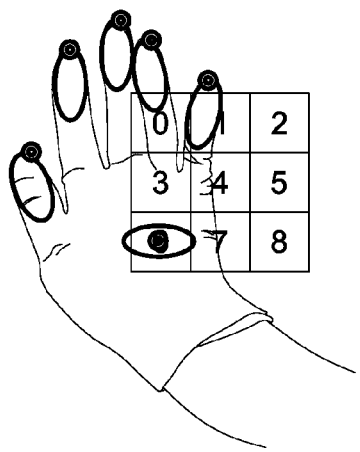
Figure 3D:
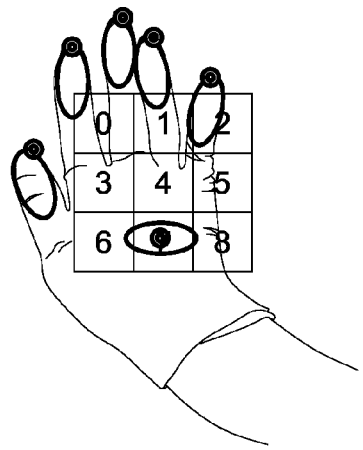

Similarly, as shown in FIG. 3B, if the user wants to type "h", the user moves the glove 320 until the on-board computing system 204 of the user interface system 200 determines that the feature point marker 330 of the user right hand 310 is located within the region "4" of the control region. The user moves/taps/bends the index finger which indicates click on the key "h" when the user sees the active identifier 360. By identifying this finger click as clicking the key "h", the on-board computing system 204 controls the display 202 to display the typing result 370 which shows "dh" and the on-board computing system 204 sends a typing event which indicates that the key "h" is struck. Operations shown in FIGS. 3C and 3D are similar and the details are omitted for the sake of brevity.

Further, after the on-board computing system 204 obtains the coordinates of the fingernail-type markers 340, the on-board computing system 204 controls the display 202 to display hand/finger tracking information 380 which shows the positions of the fingernail-type markers 340 of the glove 320 (i.e. the positions of the fingernails of the user hand 310).

The user may have no or little mental afford on memorizing the layout of the QWERTY-like keyboard 241 and the mapping relationship because the mapping between the layout of the QWERTY-like keyboard 241 and the regions of the control region 242 is designed based on human instinct. For example, the keys q, w, e, r and t which are at the left-up corner of the layout of the QWERTY-like keyboard 241 is mapped to the region "0" at the left-up corner of the control region 242; and similarly, the keys g, h, j, k and l which are at the middle center of the layout of the QWERTY-like keyboard 241 is mapped to the region "4" at the middle center of the control region 242.

Figure 4:
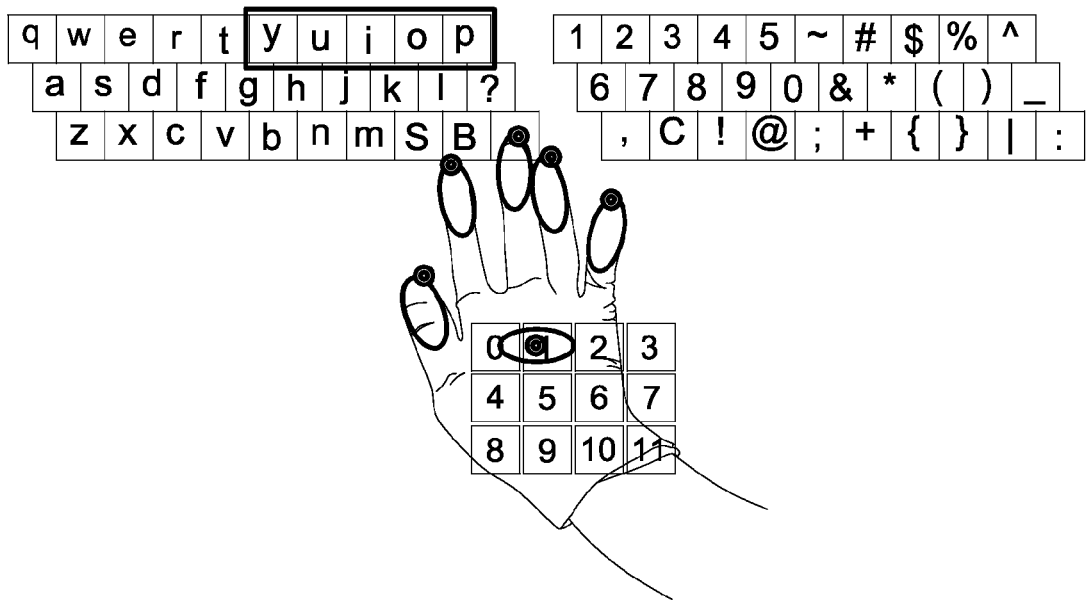
FIG. 4 shows another keyboard layout according to the embodiment of the disclosure that user can input data by wearing markers or gloves.

Referring to FIG. 4, another keyboard layout is shown according to the embodiment of the disclosure wherein a user can input data by wearing markers or gloves. In this example, the QWERTY-like keyboard may be divided into 12 subgroups. The relationship between the 12 subgroups of the QWERTY-like keyboard and the regions of the control region may be summarized in a key-region mapping table as Table 2 below. In other possible embodiment of the disclosure, the user may input data by wearing markers on the fingers of the hand (but the user does not wear the glove). In still other possible embodiments of the disclosure, the user may input data by wearing a glove or gloves which include(s) a feature point but no markers. That is to say, in the embodiments of the disclosure, the glove, the fingernail-type marker and the feature point marker are optional.

TABLE 2

| Region | Keys related to a first one of the fingers of user hand | Keys related to a second one of the fingers of user hand | Keys related to a third one of the fingers of user hand | Keys related to a fourth one of the fingers of user hand | Keys related to a fifth one of the fingers of user hand |
|---|---|---|---|---|---|
| 0 | q | w | e | r | t |
| 1 | y | u | i | o | p |
| 2 | 1 | 2 | 3 | 4 | 5 |
| 3 | ~ | # | $ | % | ^ |
| 4 | a | s | d | f | g |
| 5 | h | j | k | l | ? |
| 6 | 6 | 7 | 8 | 9 | 0 |
| 7 | & | * | ( | ) | - |
| 8 | z | x | c | v | b |
| 9 | n | m | S (Space) | B (Backspace) | . |
| 10 | , | C (Clear) | ! | @ | ; |
| 11 | + | { | } | \| | : |

The user operation on the keyboard layout of FIG. 4 is similar to those described above and thus the details are omitted for the sake of brevity.

Figure 5:
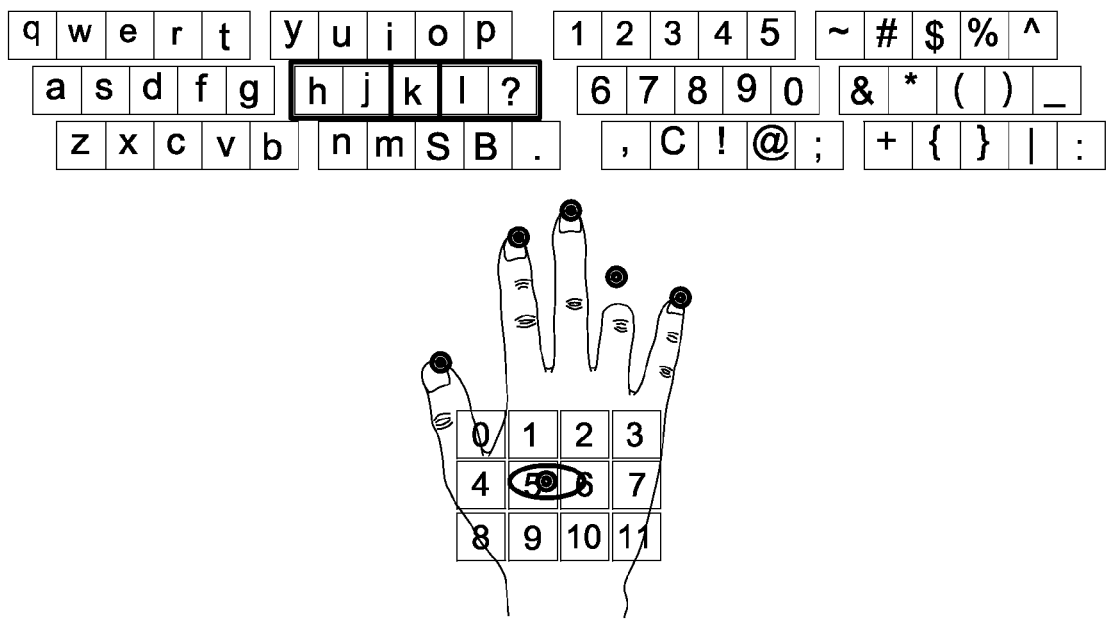
FIG. 5 shows another example that user can input data with bare hand according to the embodiment of the disclosure.

Referring to FIG. 5, another example is shown according to the embodiment of the disclosure wherein a user can input data with bare hand. As described above, in FIGS. 3A-3D and 4, the user wears the glove having the feature point marker 330 and the five fingernail-type markers 340 to input data to the user interface system. Differently, in FIG. 5, when the user is typing in the air on the user interface system 200, the user does not wear the glove. Therefore, the user interface system 200 detects and tracks the feature point of the user hand to determine whether the feature point of the user hand is located within the target region of the control region. Similarly, the feature point may be any point of the back or the thumb-index web of the user hand. Besides, the user interface system 202 detects and tracks the fingertip of the user hand and controls the display to display the hand/finger tracking information.

The user operation on the keyboard layout of FIG. 5 is similar to those described above and thus the details are omitted here for the sake of brevity.

Figure 6:
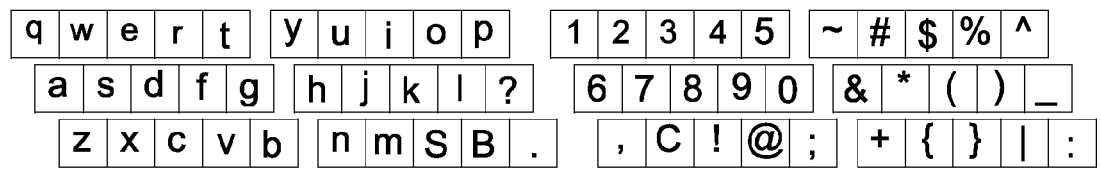
FIG. 6 shows another example of the embodiment of the disclosure that user can input data with 2-hand.
Figure 6:
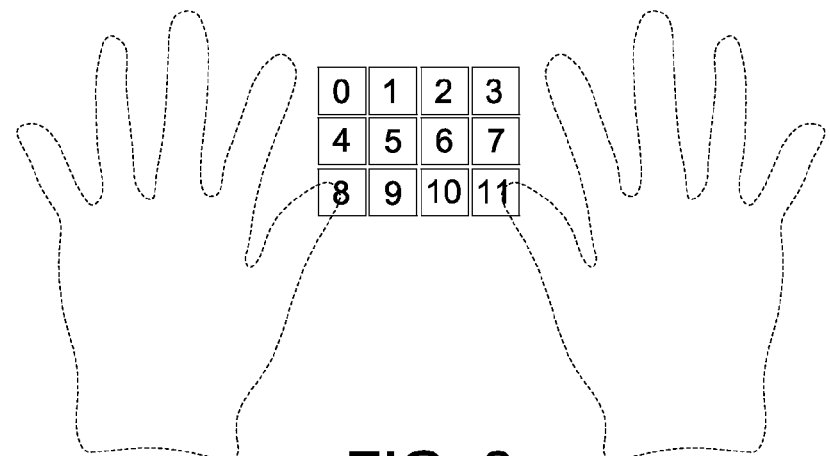

Now, referring to FIG. 6, another example of the embodiment of the disclosure is illustrated. In FIG. 6, when typing, the user does not wear the glove having markers. That is to say, a user can input data with 2-hand.

In FIG. 6, the user uses two hands to type on the user interface system 200. In FIG. 6, the QWERTY-like keyboard may be divided into 12 subgroups and each subgroup is mapped to a respective region of the control region in a predetermined mapping relationship. The relationship between the 12 subgroups of the QWERTY-like keyboard and the 12 regions of the control region may be summarized in a key-region mapping table as Table 3 below. Further, the left-half regions (i.e. regions 0, 1, 4, 5, 8, and 9) of the control region are mapped to the keys to be pressed by the left hand of the user; and the right-half regions (i.e. regions 2, 3, 6, 7, 10, and 11) of the control region are mapped to the keys to be pressed by the right hand of the user.

TABLE 3

| Region | Keys | Keys | Keys | Keys | Keys |
|---|---|---|---|---|---|
| 0 | q | w | e | r | t |
| 1 | y | u | i | o | p |
| 2 | 1 | 2 | 3 | 4 | 5 |
| 3 | ~ | # | $ | % | ^ |
| 4 | a | s | d | f | g |
| 5 | h | j | k | l | ? |
| 6 | 6 | 7 | 8 | 9 | 0 |
| 7 | & | * | ( | ) | - |
| 8 | z | x | c | v | b |
| 9 | n | m | S (Space) | B (Backspace) | . |
| 10 | , | C (Clear) | ! | @ | ; |
| 11 | + | { | } | \| | : |

After the user interface system determines that either of the feature points of the user two hands enters one of the regions of the control region, the active identifier is displayed and the user may tap/bend the finger of the right/left hand to type on the user interface system 200.

For example, if the user wants to type "a" and "&", the user moves the left hand into the region "4" and the user taps/bends the little finger of the left hand; and then the user moves the right hand into the region "7" and the user taps/bends the thumb of the right hand.

Figure 7:
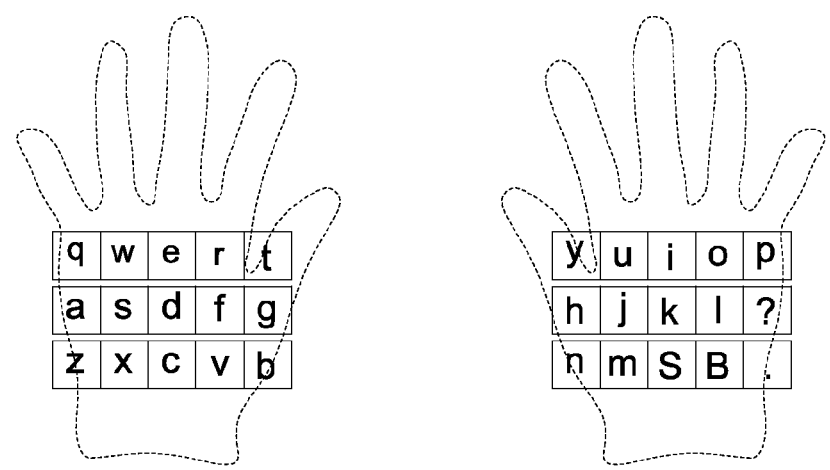
FIG. 7 shows another example of the embodiment of the disclosure that control region can be combined with key subgroups and mapping keys can be changed by movement of hands.

Now, referring to FIG. 7, another example of the embodiment of the disclosure is illustrated. In FIG. 7, when typing, the user does not wear the glove having markers; and control region can be combined with the key subgroups and mapping keys can be changed by movement of hands.

In FIG. 7, the QWERTY-like keyboard may be divided into 6 subgroups. In this layout example of FIG. 7, the subgroups of the keys are overlapped with the regions of the control region. In other words, in the layout example of FIG. 7, the regions of the control region are combined into the subgroups of the keys. The left-hand subgroups (regions) are assigned for the left hand of the user; and the right-hand subgroups (regions) are assigned for the right hand of the user. After the user interface system 200 detects and determines that the feature point of the left/right hand of the user enters either of the subgroups (regions), the user interface system 200 controls the display to display the active identifier surrounding or enclosing the target region where the feature point enters. For example, if the user interface system 200 detects and determines that the feature point of the left/right hand of the user enters the left-up subgroup (the left-up region), the user interface system 200 controls the display to display the active identifier surrounding or enclosing the left-up region which is mapped to keys "qwert". After seeing the active identifier, the user may tap/bend the finger to start typing.

Besides, in the example shown in FIG. 7, as long as the user hand is detected as being located within the subgroup/region, the user may tap/bend the finger to type. For example, if the user interface system detects and determines that the feature point of the hand of the user enters the area of the subgroup/region mapped to the keys "asdfg", the user interface system determines that the user wants to type the left-center subgroup including the keys "asdfg". Similarly, if the user interface system detects and determines that the feature point of the hand of the user enters the area of the subgroup/region mapped to the keys "nmSB.", the user interface system determines that the user wants to type the right-bottom subgroup including the keys "nmSB.".

Figure 8A:
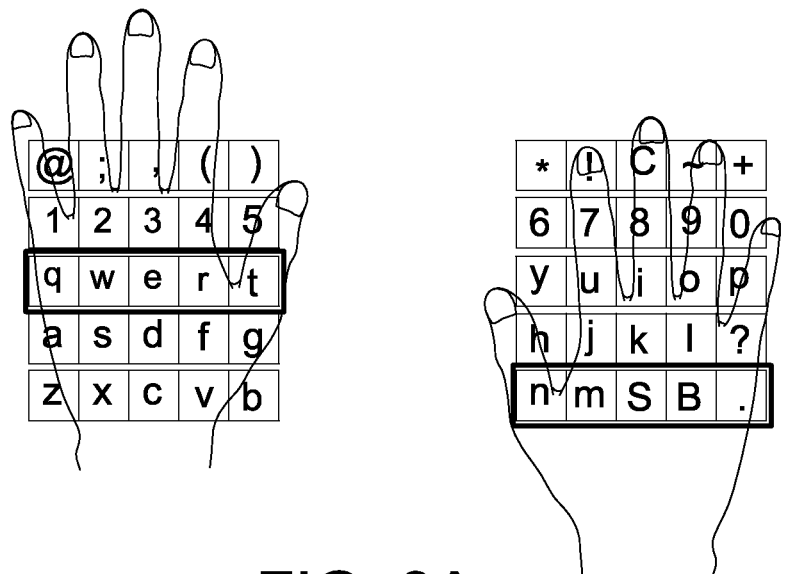
FIG. 8A and FIG. 8B shows another example of the embodiment of the disclosure that control region can be combined with key subgroups and mapping keys can be changed by movement of hands.
Figure 8B:
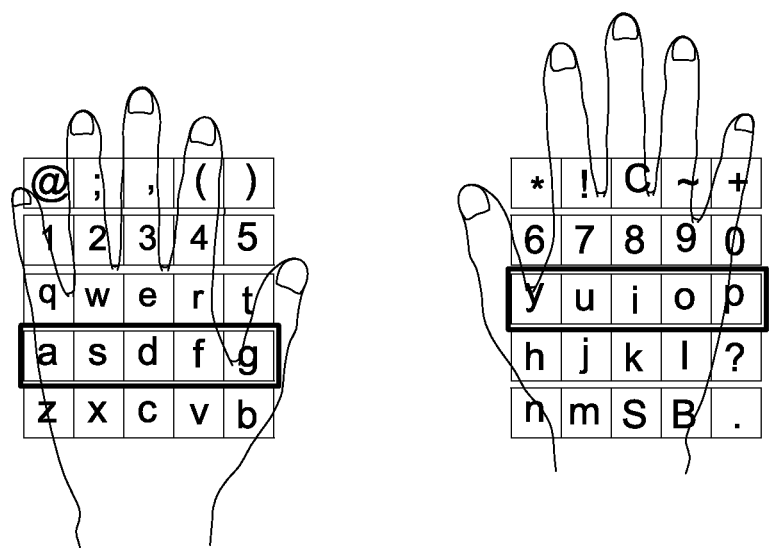

Now, referring to FIG. 8A and FIG. 8B, another example of the embodiment of the disclosure is shown, wherein control region can be combined with key subgroups and mapping keys can be changed by movement of hands. In FIG. 8A and FIG. 8B, when typing, the user does not wear the glove having markers. FIG. 8A and FIG. 8B show a different key layout from that in FIG. 7. Operations of FIG. 8A and FIG. 8B are similarly to those of FIG. 7 and thus the details are omitted here for brevity. In FIG. 7, FIGS. 8A and 8B, the feature point includes a respective point of a respective back of the user right/left hand.

As exemplified in FIGS. 6-8B, the user does not wear a glove with markers. In addition, the user may wear glove(s) with markers for assisting in identification/tracking of the feature point and the user fingers when the user is typing on the example in FIGS. 6 to 8B.

Still further, in other possible examples, the keyboard layout may be suitable for single hand typing, in addition to the example for the user to type with two hands in FIG. 7, 8A or 8B. For example, the subgroups of the keyboard layout may be arranged in a sequence (for example, in an up-bottom sequence) so that the user may type with a single hand. This is still within the spirit and scope of the disclosure. In one embodiment, the location of the plural regions of the control region can be overlapped with the location of the plural key subgroups of the virtual keyboards.

In the above example, the keyboard layout, the control region, the active identifier, the typing result, and the hand/finger tracking information may be shown on the display of the user interface system. The captured images of the user hand(s) may be not necessary to be displayed on the display of the user interface system because the user may see the user hand(s) with the user's eyes.

Figure 8C:
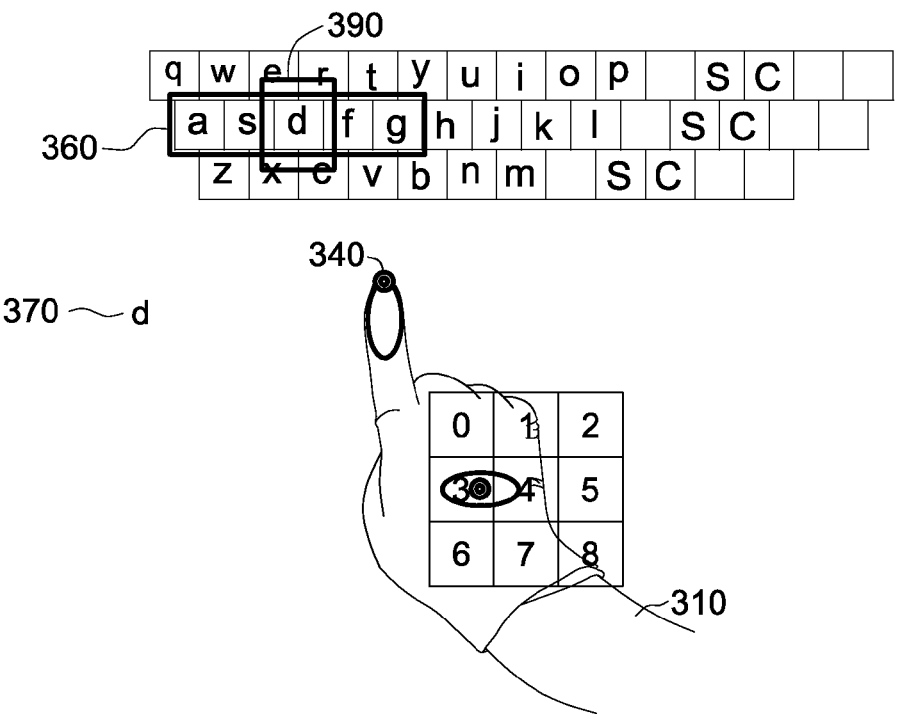
FIG. 8C shows another example of the embodiment of the disclosure that user may type by one user finger.

FIG. 8C shows another example of the disclosure wherein the user may type by one single finger. As shown in FIG. 8C, after the system determines that the feature point is located in the region "3", the system displays the active identifier 360 which surrounds the keys "asdfg". After the system detects the position of the user finger (for example but not limited by, an index finger), the system determines that the user want to type "d", then the system displays another active identifier 390 surrounding the key "d". Then, the user may tip his finger and the system will translate this finger tip as pressing the key "d".

Figure 8D:
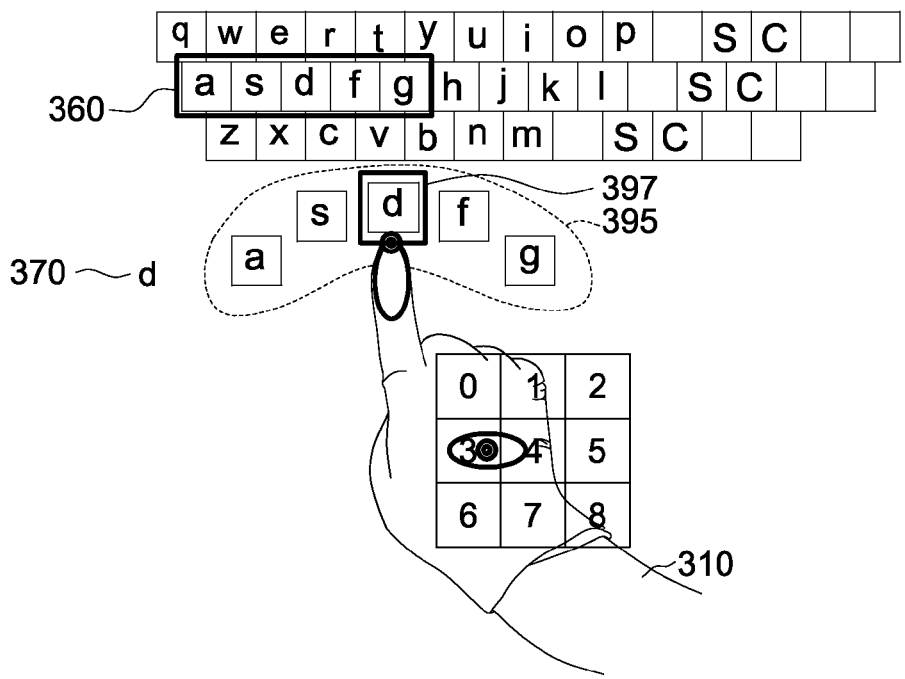
FIG. 8D~8E show still another example of the embodiment of the disclosure that user may type by one user finger.
Figure 8E:
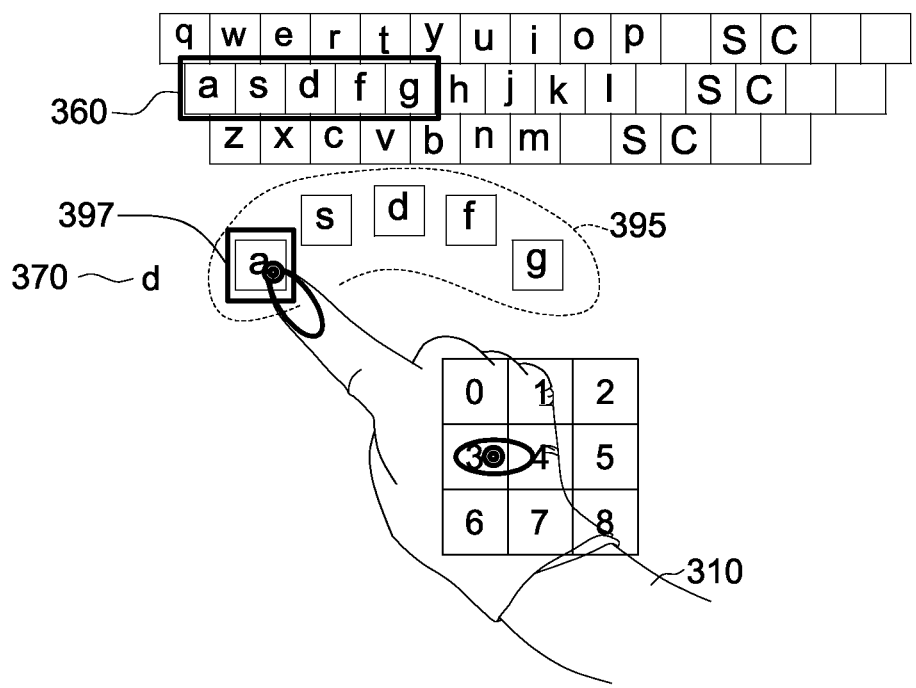

FIG. 8D~8E show still another example of the disclosure wherein the user may type by one single finger. As shown in FIG. 8D, after the system determines that the feature point is located in the region "3", the active identifier 360 which surrounds the keys "asdfg". After the system detects the position of the user finger (for example but not limited by, an index finger), the system further displays keys "asdfg" 395 near the location of the user finger. After the system determines that the user wants to type "d", then the system displays another active identifier 397 surrounding the key "d" of the keys 395. Then, the user may tip his finger and the system will translate this finger tip as pressing the key "d". Similarly, FIG. 8E shows that user may type the key "a" by moving the user finger.

FIGS. 8C~8E show that user types by one user finger. Of course, the user may type by a respective finger of a respective hand. In other words, the examples in FIGS. 8C~8E may be combined with the examples of FIG. 6~FIG. 8B which are still within the scope of the disclosure.

Figure 9:
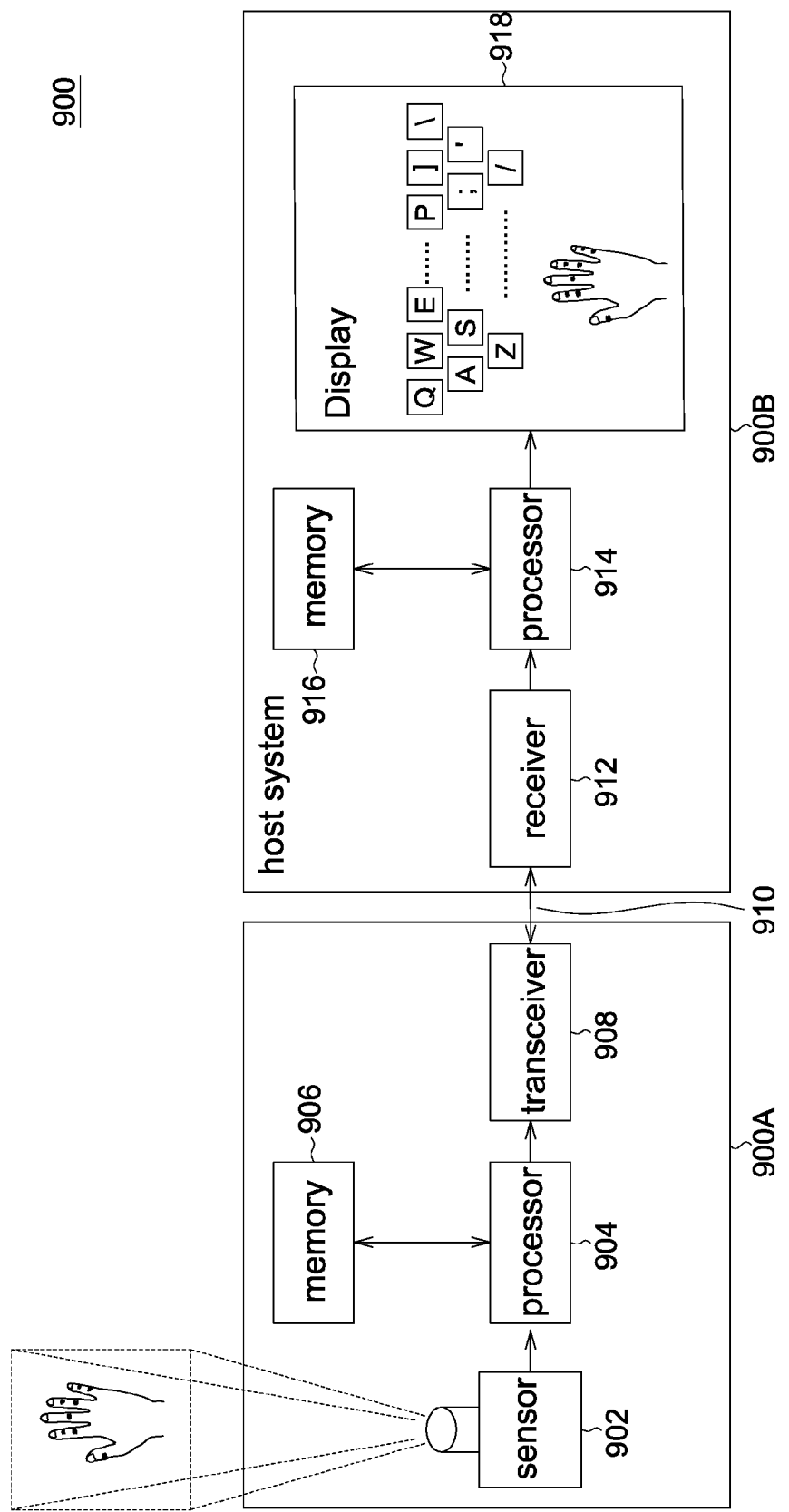
FIG. 9 shows a system for receiving user input including a user interface system and a host system according to another embodiment of the disclosure.

Now, referring to FIG. 9, a system 900 for receiving user input is shown according to another embodiment of the disclosure. The system 900 includes a user interface system 900A and a host system 900B. The user interface system 900A includes a sensor 902, a processor 904, a memory 906, and a transceiver 908. The host system 900B includes a receiver 912, a processor 914, a memory 916, and a display 918. The user interface system 900A and the host system 900B are coupled via a communication link 910. The communication link 910 may be a wireless or a wired connection. For example, the communication link 910 may be a wired link via a serial bus such as USB, or a parallel bus. The communication link may be a wireless connection, such as Bluetooth, IEEE 802.11 or other wireless based communication links.

The components 902, 904, and 906 of the user interface system 900A are similar to those of the user interface system 100/200, except that the user interface system 900A optionally includes a display. The transceiver 908 of the user interface system 900A is for transmitting and receiving data from the host system 900B. The receiver 912 of the host system 900B is for transmitting and receiving data from the user interface system 900A.

Functions and operations of the processor 120 of the user interface system 100 are implemented by the processor 904 and/or the processor 914. For example, the processor 904 determines whether the feature point of the glove/user's hand is within the target subgroup/region, and translates the user finger tap as key stroke. The determination of the processor 904 and the captured images are sent to the processor 914 via the transceivers 908, the communication link 910 and the receiver 912. The processor 914 controls the display 918 to display the keyboard layout, the control region, the user hand image, the active identifier, the typing result, the hand/finger tracking information and so on.

Figure 10:
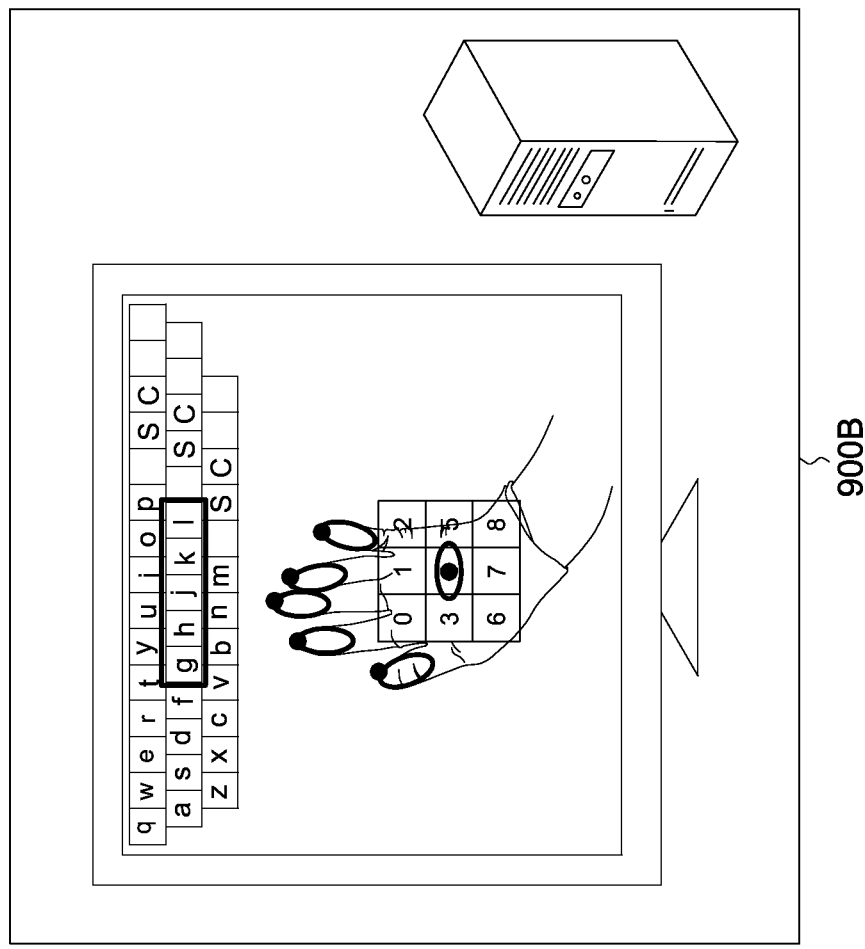
FIG. 10 shows an example of the system of FIG. 9.
Figure 10:
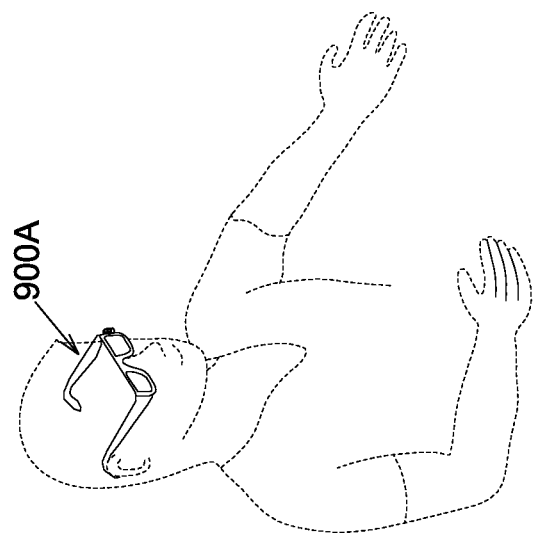

FIG. 10 shows an example of the system 900 of FIG. 9. In FIG. 10, the user interface system 900A is in the form of a wearable computing device; and the host system 900B may be any type of computing device such as a PC, a laptop computer, a mobile telephone, and so on, that is configured to transmit data to the user interface system 900A in a wired or wireless manner.

After the user wears the user interface system 900A, the user may reach the hand/glove within the sensing range of the sensor 902 and/or the capturing range of the image capture unit (not shown); and the user may see the captured hand images on the display 918 of the host system 900B.

After the processor 904 of the user interface system 900A determines that the feature point of the hand/glove is within a subgroup/region, an active identifier is shown on the display 918 of the host system 900B and the user may tap/bend the finger to type on the user interface system 900A. The typing result is shown on the display 918. That it to say, during typing, the user watches the display 918 of the host system 900B.

The keyboard layout and the control region shown in FIGS. 3A to 8B may be applicable to FIGS. 9 and 10. Further, the keyboard layout, the control region, the active identifier, the captured images of the user hand(s), the typing result, and the hand(s)/finger(s) tracking information may be shown on the display of the host system. On the other hand, in the examples of FIG. 9 or 10, the user interface system is for capturing images of user hand(s) and for sensing the movements of the user hand(s)/finger(s). The determination as to whether the user hand(s) is within the desired region and whether the user finger is tapping may be made by either the user interface system 900A or the host system 9008.

Figure 11:
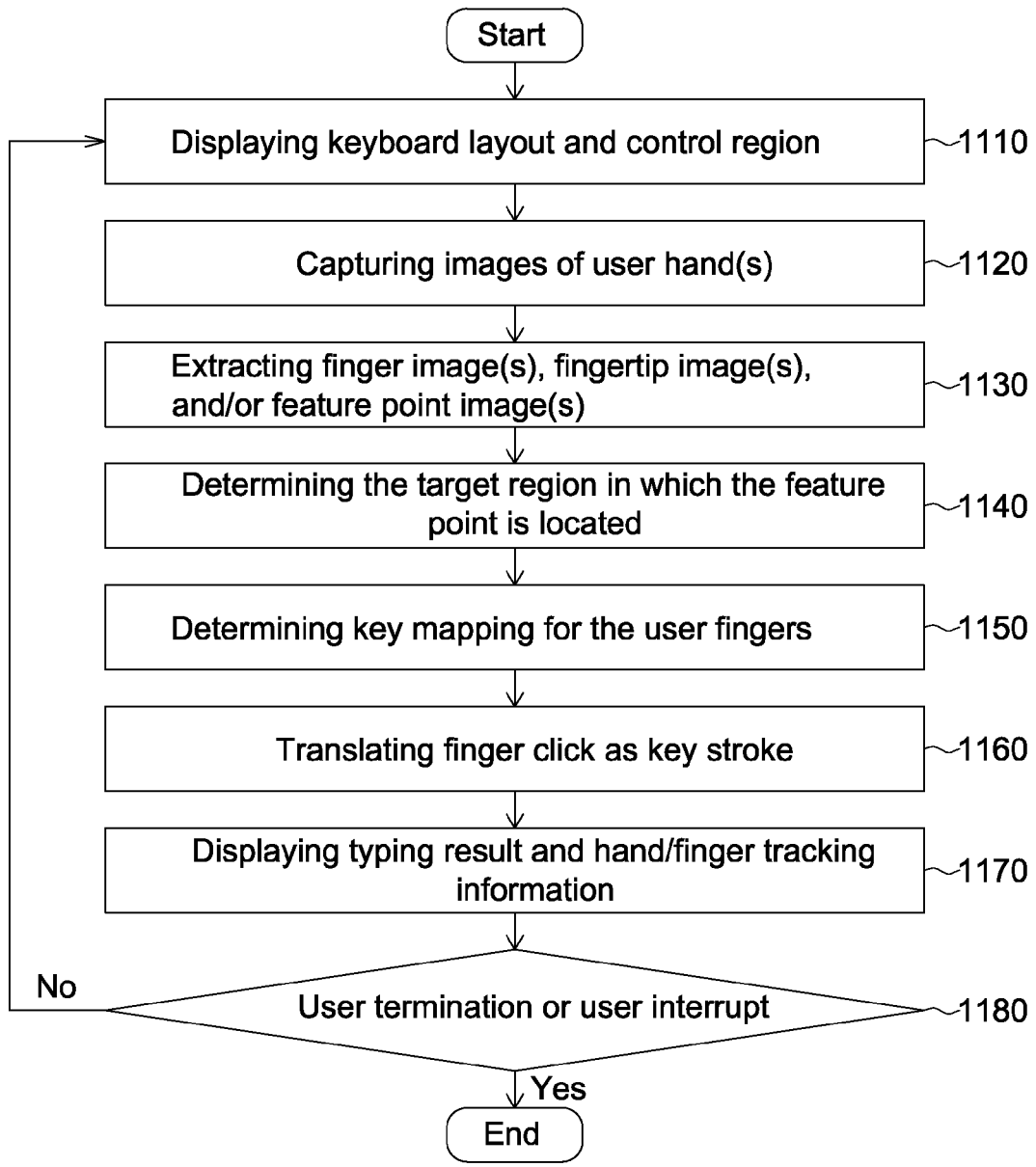
FIG. 11 shows an embodiment of a method according to another embodiment of the disclosure which could be used with the system shown in FIG. 1 or 9.

Referring to FIG. 11, an embodiment of a method is shown according to another embodiment of the disclosure.

The method of FIG. 11, for example, can be used with the system shown in FIG. 1 or 9. The method in FIG. 11 may include one or more operations, functions, or actions. In addition to the steps shown in a sequential order, these steps may also be performed in parallel, and/or in a different order than those described herein. Also, the various steps may be combined into fewer steps, divided into additional steps, and/or removed based upon the desired need.

In addition, for the method disclosed herein, the flowchart in FIG. 11 shows functionality and operation of one possible implementation of present embodiments of the disclosure. In this regard, each step may be implemented by a module, a circuitry, a segment, or a portion of program code, which includes one or more instructions executable by a processor for implementing functions or steps disclosed. The program code may be stored on any type of computer readable medium, for example, such as a storage device including a disk or hard drive, or flash memory. The computer readable medium may include non-transitory computer readable medium, for example, Random Access Memory (RAM). The computer readable medium may also include non-transitory media, such as read only memory (ROM), optical or magnetic disks, or built-in memory in firmware. The computer readable media may also be any other volatile or non-volatile storage systems.

In step 1110, the keyboard layout and the control region are displayed. For example, the keyboard layout and the control region may be displayed on the display of the user interface system and/or the host system.

In step 1120, the images of the user hand(s) are captured. For example, the images of the user hand(s) may be captured by the video camera of the user interface system. Orders of the steps 1110 and 1120 are exchangeable.

In step 1130, the finger image(s), the fingertip image(s) and/or the feature point image(s) are extracted from the captured images. For example, the finger image(s), the fingertip image(s) and/or the feature point image(s) may be extracted by the processor(s) of the user interface system and/or the host system. For example, the step of extracting the plurality of locations of the object may extract at least one image of at least one of a plurality of user fingers, a plurality of user fingertips and/or the feature point of at least one user hand from the at least one captured image.

In step 1140, the target region of the control region in which the feature point is located is determined. For example, the processor(s) of the user interface system and/or the host system may determine the target region of the control region in which the feature point is located.

In step 1150, key mapping for the user fingers is determined, for example, by the processor(s) of the user interface system and/or the host system. The key mapping refers to mapping the keys to the target region where the feature point is located and/or mapping the mapped keys to user fingers. As described above in FIG. 6, for example, the key mapping may refer to mapping the keys "asdfg" to the region "4" if the feature point is located in the region "4" and mapping the keys "asdfg" to user fingers.

In step 1160, finger click by the user is translated as key stroke, for example, by the processor(s) of the user interface system and/or the host system.

In step 1170, after finger click translation, the typing result and the hand/finger tracking information are sent and displayed, for example, on the display of the user interface system and/or the host system.

In step 1180, whether a user terminates or interrupts data input is judged. For example, a user may terminate or interrupt data input by voice control or by pressing a physical or virtual key. If no in step 1180, then the flow returns to the step 1110. If yes in step 1180, then the flow ends.

Figure 12:
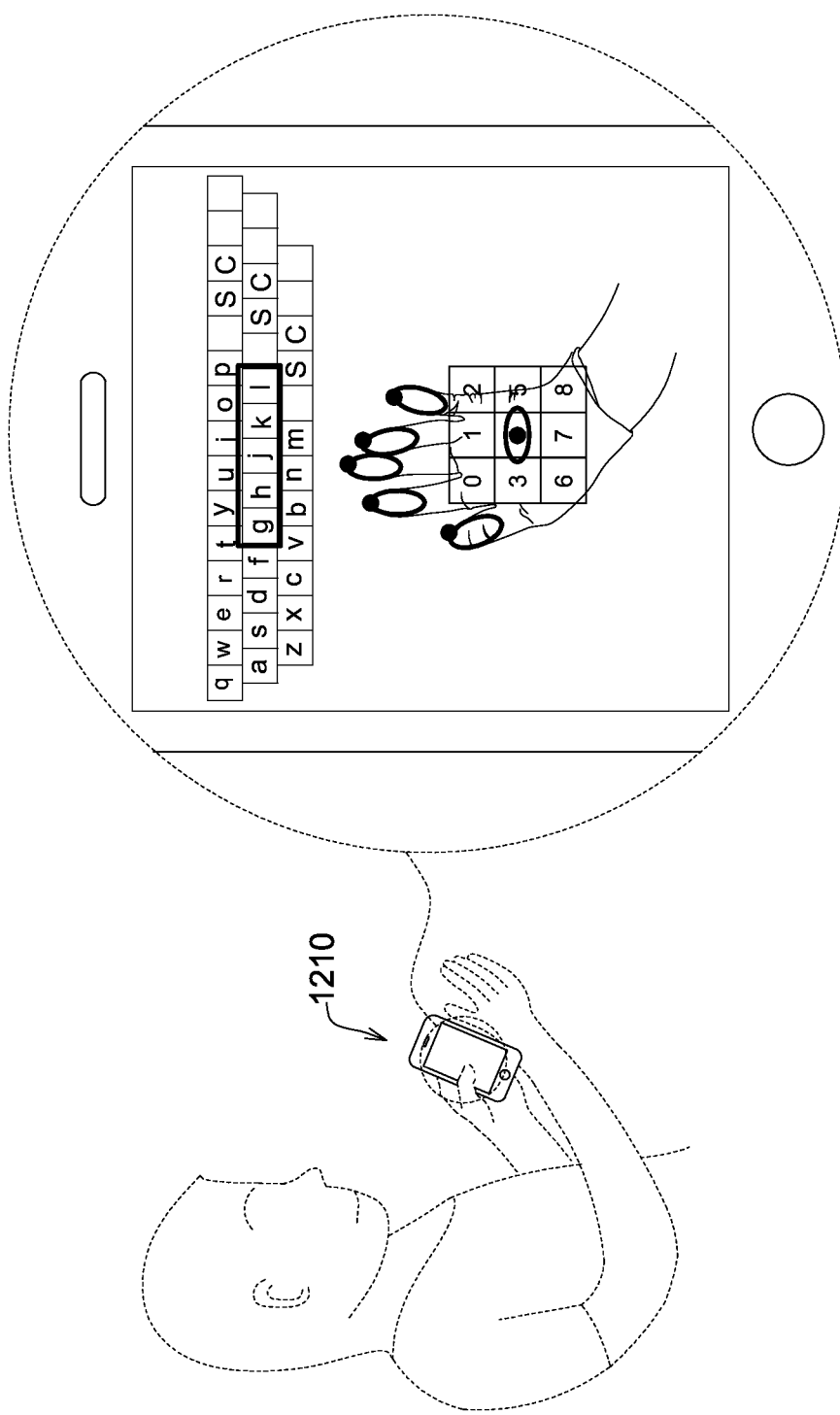
FIG. 12 shows another system for receiving user input according to yet another embodiment of the disclosure.

FIG. 12 shows another system for receiving user input according to yet another embodiment of the disclosure. As shown in FIG. 12, in data input, a mobile device 1210 (for example but not limited to, a mobile phone or a tablet PC) is held by a user. The mobile device 1210 includes a sensor, a processor, a memory, and a display, which is similar or the same as those of FIG. 1. During user input, the mobile device 1210 captures and senses one hand of the user. The captured hand image, the typing result, the virtual keyboard layout and the control region are displayed on the mobile device 1210. Operations of user input data into the mobile device 1210 are the same or similar to those as discussed above and thus are omitted here.

A program storage medium storing a computer program for causing an electronic device to perform the steps of: displaying a virtual keyboard layout and a control region, the virtual keyboard layout including a plurality of key subgroups each mapped to a respective one of a plurality of regions of the control region; extracting images of an object from at least one captured image to identify the location of a feature point of the object; determining, among the regions of the control region, a target region in which the feature point is located; determining keys mapped to the target region; and translating movements of the object as input data to a user interface system.

In addition, in an embodiment, the computing system further comprises at least one processor for performing relevant control procedures.

In another embodiment, the computing system could be circuit design, be implemented on a chip. Specifically, any embodiment could be implemented by using a hardware description language (such as Verilog or VHDL) for circuit design, including circuit integration and layout. A circuit may be designed utilizing the hardware description language in numerous manners. For example, the manufacturer of integrated circuits may realize implementation with application-specific integrated circuits (ASIC) or customer-design integrated circuits.

As described above, the embodiments of the disclosure at least have features such that, in air typing, hand movement distance is minimized because the regions of the control region are very close to each other. On the contrary, when typing on a conventional keyboard, hand movement distance is usually long so that users may take more time on typing.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for receiving input data comprising:
    displaying a virtual keyboard layout and a control region by a computing system, the virtual keyboard layout including a plurality of keys, and the plurality of keys being divided into a plurality of key subgroups each mapped to a respective one of a plurality of regions of the control region, including determining to display the virtual keyboard layout and the control region free of correspondence to a user hand;
    extracting, by the computing system, a plurality of locations of points of the user hand from at least one captured image to identify a location of a feature point of the user hand;

comparing, by the computing system, the location of the feature point of the user hand with the plurality of regions of the control region to determine, among the plurality of regions of the control region, a target region in which the feature point of the user hand is located;

highlighting a plurality of mapped-keys from the plurality of keys according to the target region;

after the target region is determined, displaying a first active identifier surrounding the plurality of mapped-keys;

after a location of a user finger of the user hand is detected, displaying, near the location of said user finger, a first group of keys that include same keys as the plurality of mapped-keys;

in response to an action of said user finger, displaying a second active identifier surrounding one key of the first group of keys; and determining one of the mapped-keys as input data to a user interface system according to the action of said user finger.

2. The method as claimed in claim 1, wherein a respective key subgroup of the virtual keyboard layout is mapped to the respective one of the plurality of regions of the control region based on a position of the plurality of key subgroups in the virtual keyboard layout and a position of the respective one of the plurality of regions in the control region.

3. The method as claimed in claim 1, wherein the step of extracting the plurality of locations of the points of the user hand includes:

extracting at least one image of at least one of a plurality of user fingers, a plurality of user fingertips and/or the feature point of at least one user hand from the at least one captured image.

4. The method as claimed in claim 1, wherein the feature point includes at least one point of a back of at least one user hand, and the at least one point of the back of the at least one user hand includes a thumb-index web or a center of the back of the at least one user hand.

5. The method as claimed in claim 1, further comprising placing a glove or gloves having a feature point marker and a plurality of fingernail-type markers on the user hand, wherein the extracting of the plurality of locations of the points of the user hand includes:

extracting a plurality of images of the plurality of fingernail-type markers and the feature point marker from the at least one captured image.

6. The method as claimed in 1, further comprising a step of:

displaying at least one of an input result, tracking information and the at least one captured image of the user hand.

7. The method as claimed in 1, wherein the plurality of regions of the control region are combined into the plurality of key subgroups of the virtual keyboard layout, and a plurality of locations of the plurality of regions of the control region are overlapped with the location of the plurality of key subgroups of the virtual keyboard layout.

8. The method as claimed in claim 1, wherein the action of said user finger includes moving said user finger, tapping said user finger, bending said user finger, or clicking by said user finger.

9. A non-transitory program storage medium storing a computer program for causing an electronic device to perform the steps of:

displaying a virtual keyboard layout and a control region, the virtual keyboard layout including a plurality of keys, and the plurality of keys being divided into a plurality of key subgroups each mapped to a respective one of a plurality of regions of the control region, including determining to display the virtual keyboard layout and the control region free of correspondence to a user hand;

extracting a plurality of locations of points of the user hand from at least one captured image to identify a location of a feature point of the user hand;

comparing the location of the feature point of the object with the plurality of regions of the control region to determine, among the plurality of regions of the control region, a target region in which the feature point of the user hand is located;

highlighting a plurality of mapped-keys from the plurality of keys according to the target region;

after the target region is determined, displaying a first active identifier surrounding the plurality of mapped-keys;

after a location of a user finger of the user hand is detected, displaying, near the location of said user finger, a first group of keys which include same keys as the plurality of mapped-keys;

in response to an action of said user finger, displaying a second active identifier surrounding one key of the first group of keys; and determining one of the mapped-keys as input data to a user interface system according to the action of said user finger.

10. The program storage medium as claimed in claim 9, wherein a respective key subgroup of the virtual keyboard layout is mapped to the respective one of the plurality of regions of the control region based on a position of the plurality of key subgroups in the virtual keyboard layout and a position of the respective one of the plurality of regions in the control region.

11. The program storage medium as claimed in claim 9, wherein the step of extracting the plurality of locations of the points of the user hand includes:

extracting at least one image of at least one of a plurality of user fingers, a plurality of user fingertips and/or the feature point of at least one user hand from the at least one captured image.

12. The program storage medium as claimed in claim 9, wherein the feature point includes at least one point of a back of at least one user hand, and the at least one point of the back of the at least one user hand includes a thumb-index web or a center of the back of the at least one user hand.

13. The program storage medium according to claim 9, wherein the user hand has thereon a glove or gloves having a feature point marker and a plurality of fingernail-type markers; and the steps of extracting the plurality of locations of the points of the user hand includes:

extracting images of the plurality of fingernail-type markers and the feature point marker from the at least one captured image.

14. The program storage medium as claimed in claim 9, wherein the program storage medium causes the electronic device to further perform a step of:

displaying at least one of an input result, tracking information and the at least one captured image of the user hand.

15. The program storage medium as claimed in claim 9, wherein the plurality of regions of the control region are combined into the plurality of key subgroups of the virtual keyboard layout, and a plurality of locations of the plurality of regions of the control region are overlapped with a plurality of locations of the plurality of key subgroups of the virtual keyboard layout.

16. The program storage medium as claimed in claim 9, wherein the action of said user finger includes moving said user finger, tapping said user finger, bending said user finger, or clicking by said user finger.

\* \* \* \* \*